United States Patent
Saito et al.

(10) Patent No.: US 6,547,347 B2
(45) Date of Patent: Apr. 15, 2003

(54) DEVICE UNIT HOUSING APPARATUS

(75) Inventors: Yoshiyuki Saito, Yonezawa (JP); Mikio Takahashi, Yonezawa (JP)

(73) Assignee: NEC Corporation (JP)

( * ) Notice: Subject to any disclaimer, the term of this patent is extended or adjusted under 35 U.S.C. 154(b) by 0 days.

(21) Appl. No.: 09/841,520

(22) Filed: Apr. 24, 2001

(65) Prior Publication Data

US 2001/0036060 A1 Nov. 1, 2001

(30) Foreign Application Priority Data

Apr. 26, 2000 (JP) .................................... 2000-125969

(51) Int. Cl.[7] ................................................. G06F 1/16
(52) U.S. Cl. .................... 312/223.1; 361/726; 292/177
(58) Field of Search .............................. 292/177, 182, 292/37, 140; 312/223.1, 332.1, 222, 215, 223.2; 361/725, 726, 727

(56) References Cited

U.S. PATENT DOCUMENTS

| | | | | |
|---|---|---|---|---|
| 2,588,356 A | * | 3/1952 | Burgoyne | .................. 124/31 |
| 3,207,565 A | * | 9/1965 | Scharge | ....................... 16/357 |
| 4,125,305 A | * | 11/1978 | Kasindorf | .................... 312/233 |
| 4,943,124 A | * | 7/1990 | Dietz et al. | ................. 292/170 |
| 5,603,559 A | * | 2/1997 | Yemini | ..................... 220/4.27 |
| 6,058,016 A | * | 5/2000 | Anderson et al. | ........ 312/223.2 |
| 6,222,736 B1 | * | 4/2001 | Sim et al. | .................... 361/727 |

* cited by examiner

*Primary Examiner*—Janet M. Wilkens
(74) *Attorney, Agent, or Firm*—Hayes Soloway P.C.

(57) ABSTRACT

A device unit housing apparatus provided with a simple structure to easily engage and disengage a device unit such as a magnetic disk drive unit with or from an apparatus main body. The device unit housing apparatus includes an apparatus main body provided with an engaging through-hole formed therein for accommodating a device unit or an engaged subject, and a unit engaging mechanism provided on the device unit. The unit engaging mechanism includes a unit engaging body movable and engageable with the engaging through-hole, and an elastic member which can always press the unit engaging body against the engaging through-hole.

9 Claims, 8 Drawing Sheets

DEVICE UNIT HOUSING APPARATUS

BACKGROUND OF THE INVENTION

1. Field of the Invention

The present invention relates to structures for mounting and dismounting a device unit such as a magnetic disk drive unit. More particularly, the present invention relates to a device unit housing apparatus, provided with a simple structure, for engageably mounting and dismounting a device unit easily to or from the apparatus main body.

2. Description of the Related Art

Heretofore, there have been various types of securing means available for implementing a device unit such as a magnetic disk drive unit on the apparatus main body and for securing the device unit thereto. For example, as exemplified in FIG. 8, securing means of a device unit 101 have a plurality of unit securing portions 116 provided on an apparatus main body 115, and mated members 103 each corresponding to each of the unit securing portions 116, the mated members 103 being provided on the device unit 101. With this configuration, the securing means allow fastening members such as screws to be used to secure the device unit 101 to the apparatus main body 115 at each of the unit securing portions 116 of the apparatus main body 115.

However, the aforementioned conventional example presented such a drawback that a plurality of fastening members such as screws had to be used at a plurality of positions to secure the device unit 101 to the apparatus main body 115, thus wasting time for the securing work. In addition, there was another drawback that the device unit 101 could not be dismounted without opening a panel 109 and removing a plurality of fastening members such as screws, thus wasting time for the dismounting work.

In other words, mounting or dismounting the device unit 101 to or from the apparatus main body 115, for example, in an assembly line of a factory, would require too much labor and time, leading to reduced efficiency of production and making it difficult to reduce the production cost. Furthermore, for example, if a general user wants to replace the magnetic disk drive unit with another unit of a different capacity, the user would be required to screw and unscrew a plurality of fastening members such as screws, which was time-consuming and laborious.

SUMMARY OF THE INVENTION

It is an object of the present invention to provide a device unit housing apparatus which overcomes the aforementioned drawbacks of the conventional example, which has a simple configuration for allowing a device unit to be easily engaged with an apparatus main body upon mounting and dismounting the device unit such as a magnetic disk drive unit to or from the apparatus main body, and which can also release the engagement easily.

To achieve the aforementioned object, the device unit housing apparatus according to a first aspect of the present invention includes an apparatus main body provided with an engaging through-hole formed therein for accommodating a device unit or an engaged subject, and a unit engaging mechanism provided on the device unit. The unit engaging mechanism includes a unit engaging body movable and engageable with the engaging through-hole, and an elastic member capable of pressing always the unit engaging body against the engaging through-hole.

The first aspect of the present invention allows the unit engaging body to engage the engaging through-hole of the apparatus main body, thereby making it possible to engage the device unit with the apparatus main body. Furthermore, the elastic member makes use of the spring force thereof to press the unit engaging body against the engaging through-hole of the apparatus main body. The unit engaging body can thereby be easily engaged with the engaging through-hole of the apparatus main body and the device unit can thereby be kept engaged with the apparatus main body under a constant condition.

According to a second aspect of the present invention, the unit engaging mechanism includes a panel pivotable with respect to the device unit in the device unit housing apparatus according to the first aspect. In addition, the panel is provided with an engaging body presser portion capable of pressing the unit engaging body against the elastic member along with a pivotal movement of the panel.

This allows the second aspect of the present invention to function in an equivalent manner to the aforementioned first aspect of the invention as well as to move the unit engaging body by the pivotal movement of the panel.

More specifically, pivotal movement of the panel in one direction (or opening the panel) causes the engaging body presser portion of the panel to push the unit engaging body, thereby allowing the unit engaging body to be withdrawn from the engaging through-hole. This allows the device unit to be easily disengaged from the apparatus main body.

The device unit housing apparatus according to a third aspect of the invention includes an apparatus main body provided with an engaging through-hole formed therein for accommodating a device unit or an engaged subject, and a unit engaging mechanism provided on the device unit. The unit engaging mechanism provided on the device unit is disposed, with the device unit being accommodated in the apparatus main body, adjacent to an opening of the apparatus main body for accommodating the device unit.

Furthermore, the unit engaging mechanism includes a unit engaging body movable and having a unit engaging main body engageable with the engaging through-hole, an elastic member capable of always pressing the unit engaging body against the engaging through-hole, and a panel spaced by a predetermined distance apart from the unit engaging main body and pivotable with respect to the device unit. Still furthermore, the unit engaging main body is provided with a projection oriented toward the panel. The panel is provided with an engaging body presser portion capable of engaging the projection of the unit engaging body along with a pivotal movement of the panel and pressing the unit engaging body against the elastic member. Here, the engaging body presser portion is oriented toward the unit engaging body.

Thus, the third aspect of the present invention allows the unit engaging main body of the unit engaging body to engage the engaging through-hole of the apparatus main body, thereby making it possible to engage the device unit with the apparatus main body. Furthermore, the elastic member makes use of the spring force thereof to press the unit engaging body against the engaging through-hole of the apparatus main body. The unit engaging main body can thereby be easily engaged with the engaging through-hole of the apparatus main body and the device unit can thereby be kept engaged with the apparatus main body under a constant condition. In addition, since the unit engaging mechanism is disposed adjacent to the opening portion of the apparatus main body, the unit engaging mechanism can be easily actuated even after the device unit has been accommodated in the apparatus main body.

Furthermore, it is possible to move the unit engaging body by pivotal movement of the panel. More specifically, pivotal movement of the panel in one direction (or opening the panel) causes the engaging body presser portion of the panel to push the projection of the unit engaging body, thereby allowing the unit engaging main body to be withdrawn from the engaging through-hole. This allows the device unit to be easily disengaged from the apparatus main body.

According to a fourth aspect of the present invention, in the aforementioned device unit housing apparatus according to the second or third aspect, the panel is provided with a stopper for engaging the unit engaging body.

This allows the fourth aspect of the invention to function in an equivalent manner to the aforementioned second or third aspect. In addition, the stopper prevents the unit engaging body from being disengaged from the engaging through-hole even when the elastic member provides only a weak force or has deteriorated.

According to a fifth aspect of the present invention, in the device unit housing apparatus according to the second, third, or fourth aspect, panel engaging members are provided in a standing manner on both ends of the panel and each of the panel engaging members is provided with an expanded projection. Furthermore, the device unit is provided with engaged members each opposed to each of the panel engaging members, and each of the engaged members is provided with an engaging slot corresponding to each expanded projection of the panel engaging member.

This allows the fifth aspect of the invention to function in an equivalent manner to the aforementioned second, third, or fourth aspect. In addition, the expanded projections of the panel engaging members provided on the panel can be engaged with the engaging slots formed on the device unit, thereby allowing the panel to be engaged with the device unit.

According to a sixth aspect of the present invention, the aforementioned device unit housing apparatus according to any one of the first to fifth aspects is provided with at least one fastening member such as a screw at the apparatus main body side. In addition, the device unit is provided with mated members each having a mated portion such as a through-hole or a notch corresponding to each of the fastening members.

This allows the sixth aspect of the invention to function in an equivalent manner to any one of the aforementioned first to fifth aspects. In addition, the device unit can be engaged with the apparatus main body via the mated member of the device unit corresponding to the fastening members such as screws and by the fastening members provided on the apparatus main body.

According to a seventh aspect of the present invention, in the aforementioned device unit housing apparatus according to any one of the first to sixth aspects, the engaging through-hole of the apparatus main body is formed in one plate-shaped member and the plate-shaped member is provided on the apparatus main body.

This allows the seventh aspect of the invention to function in an equivalent manner to any one of the aforementioned first to sixth aspects. In addition, it is possible to form the plate-shaped member which has an engaging through-hole formed in a different shape corresponding to various types of unit engaging mechanisms without machining the apparatus main body. This makes it possible to cope readily with various types of unit engaging mechanisms only by replacing the plate-shaped member as appropriate.

According to an eighth aspect of the present invention, in the aforementioned device unit housing apparatus according to any one of the first to fifth aspects, the engaging through-hole of the apparatus main body is formed in one plate-shaped member and the plate-shaped member is provided on the apparatus main body. Furthermore, the plate-shaped member is provided with at least one fastening member such as a screw, and the device unit is provided with mated members each having a mated portion such as a through-hole or a notch corresponding to each of the fastening members.

This allows the eighth aspect of the invention to function in an equivalent manner to one of the aforementioned first to fifth aspects. In addition, the device unit can be mated with the apparatus main body via the mated member of the device unit corresponding to the fastening members such as screws and by the fastening members provided on the plate-shaped member of the apparatus main body.

Furthermore, it is possible to form the plate-shaped member which is provided with fastening members such as screws and which has an engaging through-hole formed in a different shape corresponding to various types of device units (the unit engaging mechanism and the mated member) without machining the apparatus main body. This makes it possible to cope readily with various types of device units only by replacing the plate-shaped member as appropriate.

The nature, principle, and utility of the invention will become more apparent from the following detailed description when read in conjunction with the accompanying drawings.

DETAILED DESCRIPTION OF THE PREFERRED EMBODIMENTS

Now, embodiments of the present invention will be explained below with reference to FIGS. 1 to 7.

Figure 1:
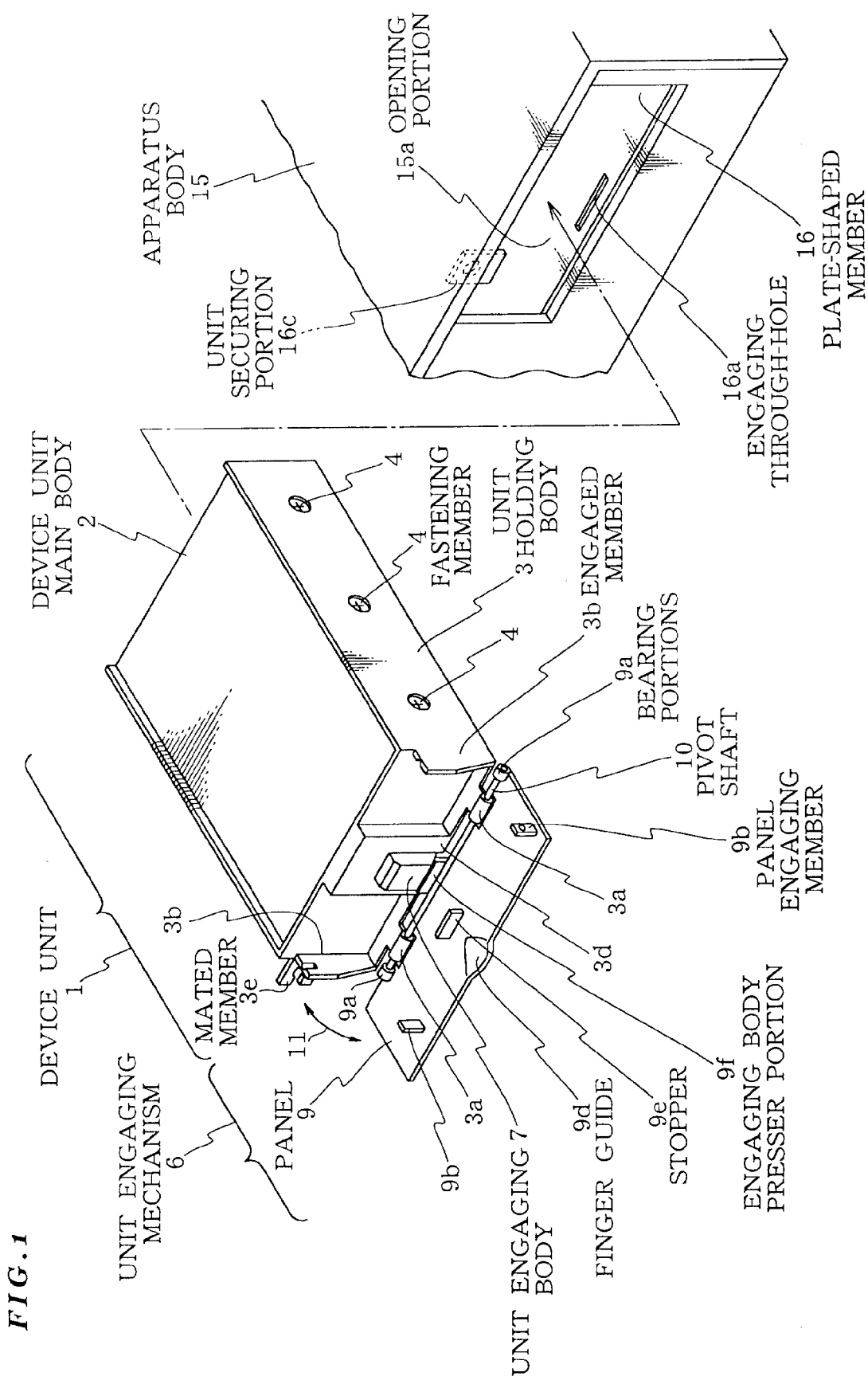
FIG. 1 is a perspective view illustrating an embodiment of the present invention.

FIG. 1 shows a device unit 1 including a magnetic disk drive unit and equipped with a unit engaging mechanism 6. Also shown is an apparatus main body 15, provided on a predetermined end thereof with an opening portion 15a, for accommodating the device unit 1 detachably therethrough.

Figure 2:
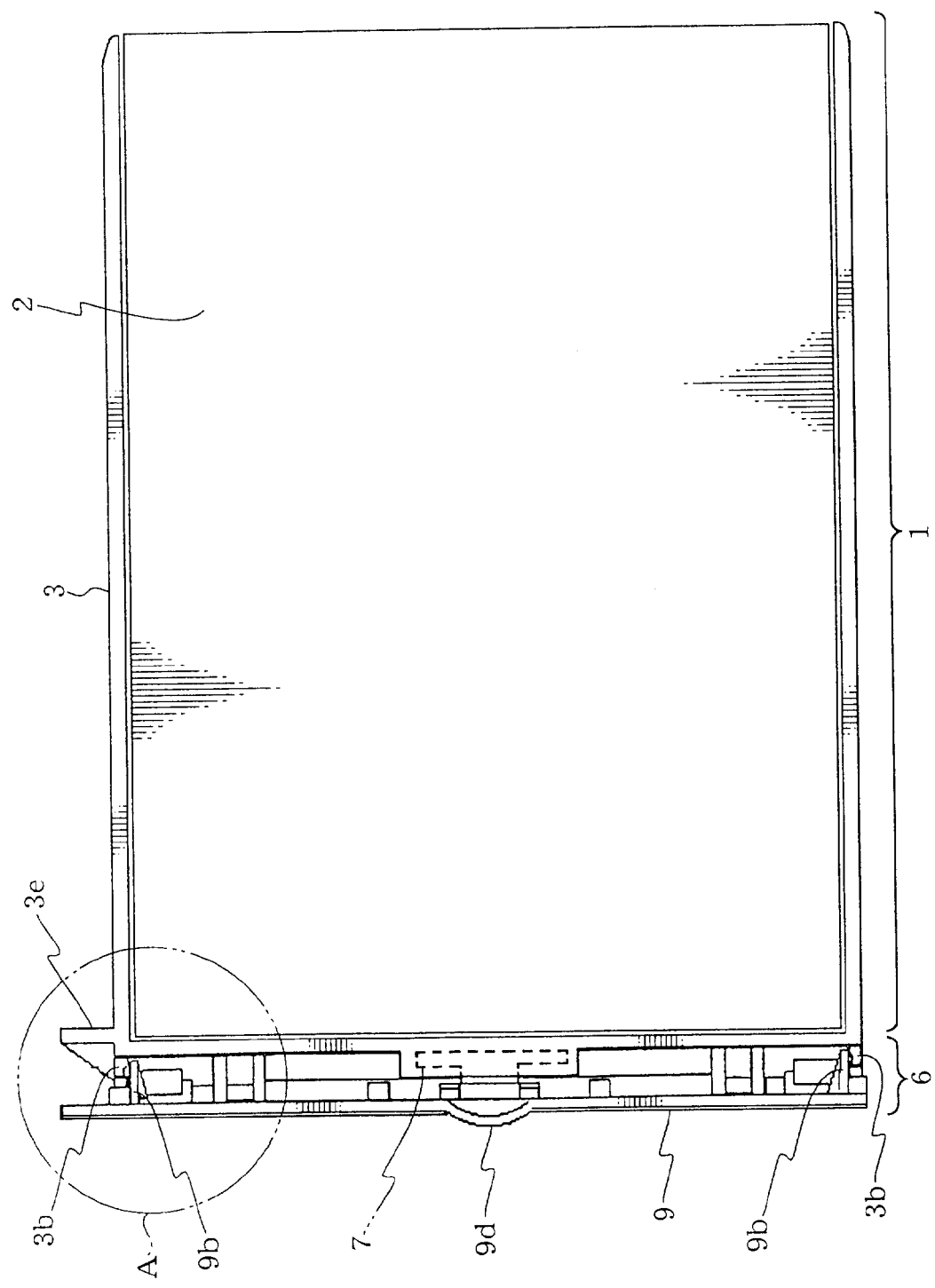
FIG. 2 is a top view illustrating a device unit equipped with a device unit housing apparatus according to the embodiment.

As shown in FIGS. 1 and 2, the device unit 1 includes a device unit main body 2 and a unit holding body 3, which are screwed together, for example, with a plurality of fastening members 4 such as screws on the both sides of the device unit main body 2 and the unit holding body 3. In addition, the aforementioned unit engaging mechanism 6 is provided on the front of the device unit 1 (adjacent to the opening portion 15a of the apparatus main body 15) and on the unit holding body 3. Moreover, the unit engaging mechanism 6 and an engaging through-hole 16a, described later, constitute a device unit housing apparatus 5. The engaging through-hole 16a is formed in the apparatus main body 15 corresponding to the unit engaging mechanism 6. The device unit housing apparatus 5 engages the device unit 1 within the device unit housing apparatus 5.

First, the unit engaging mechanism 6 will be described below.

Figure 6A:
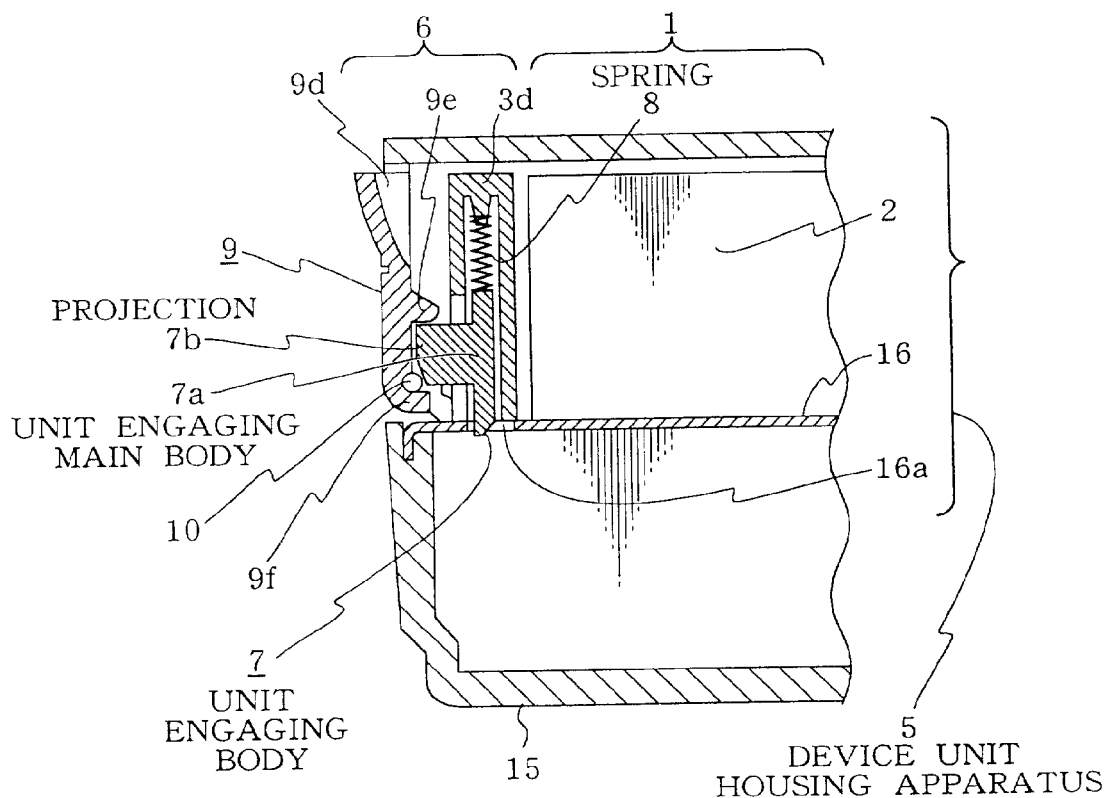
FIG. 6(a) is a cross-sectional view taken along line C—C of FIG. 4.

As shown in FIG. 6(a), the unit engaging mechanism 6 includes a movable unit engaging body 7; a spring (elastic member) 8 provided immediately above the upper end portion of the unit engaging body 7; a guide portion 3d, provided in the unit holding body 3, for accommodating the spring 8 and capable of guiding the movable direction of the unit engaging body 7; and a panel 9 for actuating the unit engaging body 7 as described later.

Now, the panel 9 will be explained below.

Figure 5A:
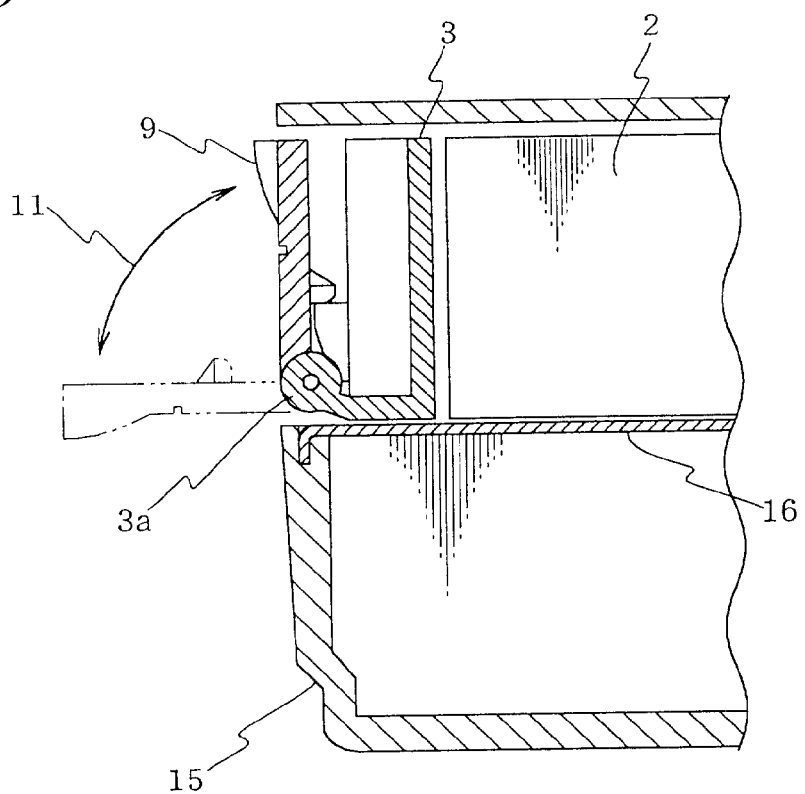
FIG. 5(a) is a cross-sectional view taken along line B—B of FIG. 4.

The panel 9 is formed of, for example, a generally rectangular plate-shaped member and is provided on the device unit 1 pivotably in a pivotal direction 11 as shown in FIGS. 1 and 5(a)

Figure 7A:
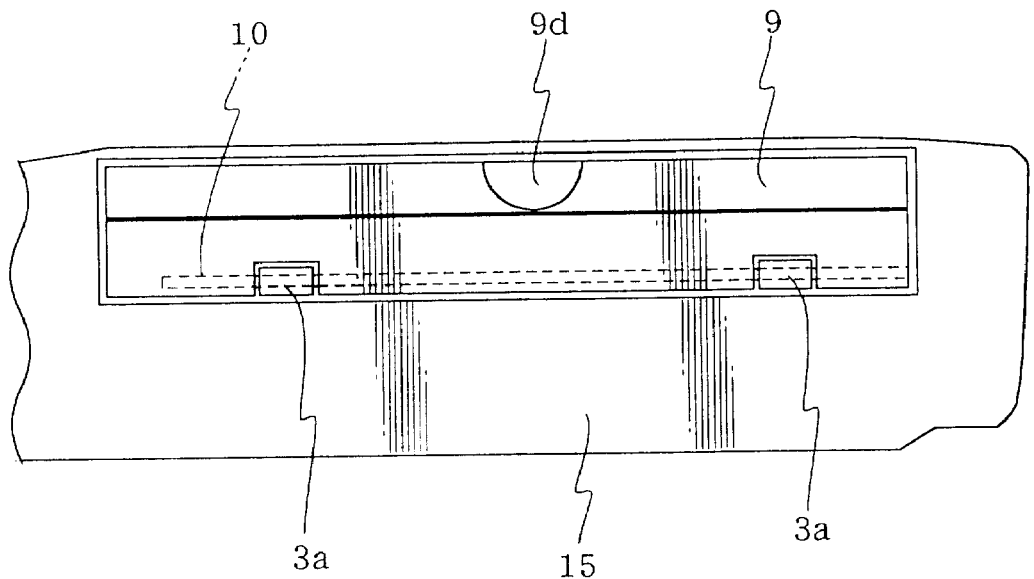
FIG. 7(a) is a front view illustrating the device unit implemented in the apparatus main body, according to the embodiment.
Figure 7B:
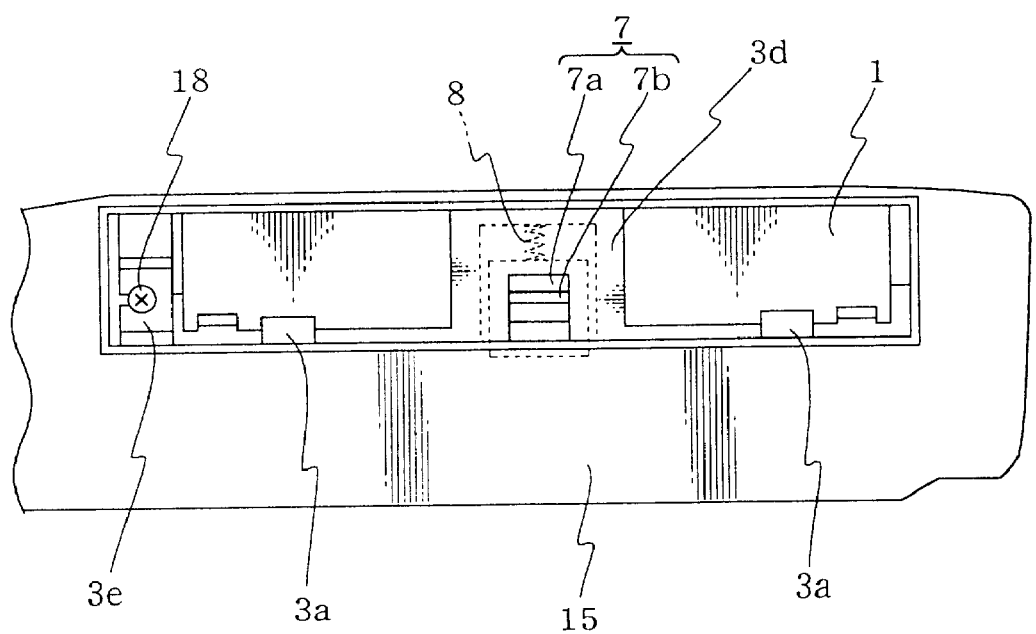
FIG. 7(b) is the front view with the panel and the pivot shaft of FIG. 7(a) being removed.
Figure 8:
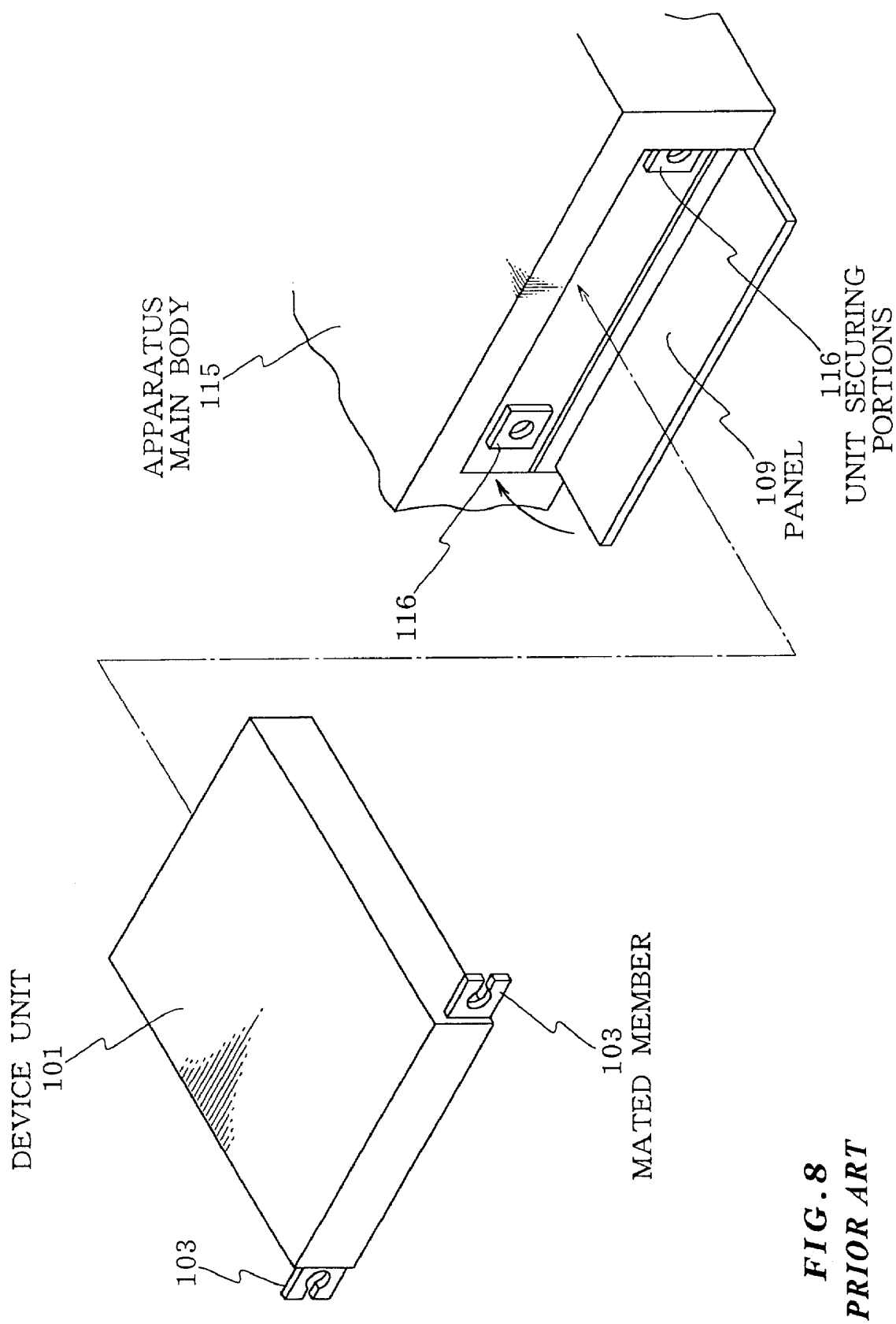
FIG. 8 is a perspective view illustrating securing means of a conventional device unit.

More specifically, as shown in FIGS. 1 and 7(b), there are provided pivot shaft holding portions 3a on the unit holding body 3, each portion spaced by a predetermined distance apart from each of the ends of the unit holding body 3. The panel 9 is pivotable about a pivot shaft 10 supported by the pivot shaft holding portions 3a. In this case, on the both ends of the panel 9, there are provided bearing portions 9a corresponding to the pivot shaft 10.

Figure 5B:
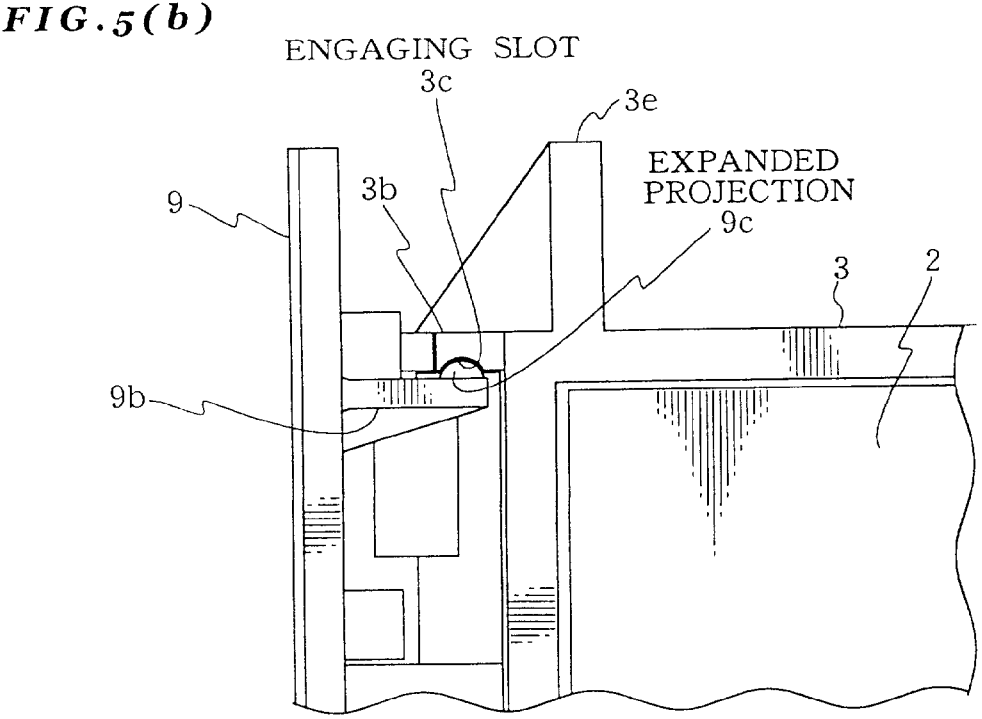
FIG. 5(b) illustrates the portion A of FIG. 2 in detail.

As shown in FIGS. 1 and 2, on the both ends of the panel 9, panel engaging members 9b are arranged in a standing manner, one on each end. As shown in FIG. 5(b), each of the panel engaging members 9b is provided with an expanded projection 9c. The unit holding body 3 is also provided with engaged members 3b each opposed to each of the panel engaging members 9b. As shown in FIG. 5(b), each of the engaged members 3b is provided with an engaging slot 3c corresponding to the expanded projection 9c. This allows the panel 9, which is pivotably provided, to be engaged with the device unit 1. Here, FIG. 5(b) illustrates one end portion of the panel 9 provided with the panel engaging members 9b, the expanded projection 9c, the engaged members 3b, and the engaging slot 3c. However, like the one end portion, the other end portion of the panel 9 is also provided with the panel engaging members 9b, the expanded projection 9c, the engaged members 3b, and the engaging slot 3c.

Furthermore, on a middle edge portion of the panel 9, there is provided, for example, a finger guide 9d having a generally elliptical cross section as shown in FIG. 1. This allows a finger to be hooked on the finger guide 9d to easily disengage the panel 9 from the device unit 1.

The panel 9 is also provided with a stopper 9e for engaging the unit engaging body 7 and an engaging body presser portion 9f for pushing the unit engaging body 7.

As shown in FIG. 6(a), the stopper 9e is oriented from the central portion of the panel 9 toward the unit engaging body 7. The engaging body presser portion 9f is also oriented from the edge portion of the side of the pivot shaft 10 on the central portion of the panel 9 toward the unit engaging body 7.

Here, the panel 9 according to this embodiment can also be employed as a handle one can use to withdraw the device unit 1 from the apparatus main body 15.

Now, the unit engaging body 7 will be explained below.

The unit engaging body 7 includes unit engaging main body 7a and projection 7b, with the panel 9 being engaged with the unit holding body 3 by means of the aforementioned expanded projection 9c of the panel 9 and the engaged members 3c of the unit holding body 3 (as shown in FIGS. 6(a) and 7(a)). Here, the unit engaging main body 7a is opposed to and spaced apart by a predetermined distance from the panel 9, and formed of a generally rectangular plate-shaped member. The projection 7b is oriented from the central portion of the unit engaging main body 7a toward the panel. In this case, the unit engaging main body 7a is arranged orthogonal to the engaging through-hole 16a, described later, to allow part of the unit engaging main body 7a to be guided into or out of the engaging through-hole 16a by the aforementioned guide portion 3d.

Figure 6B:
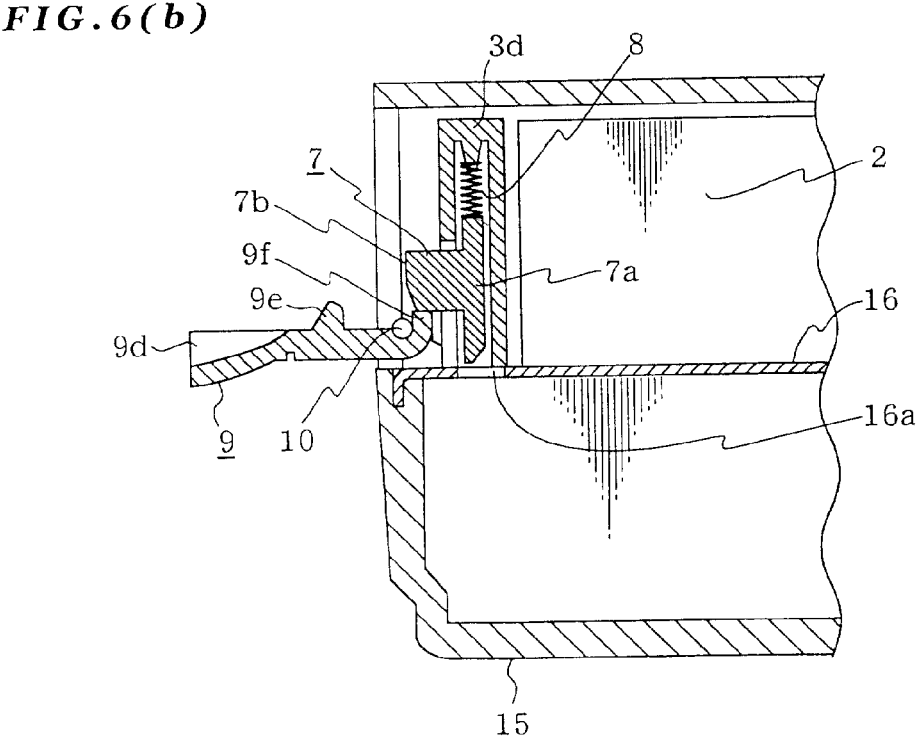
FIG. 6(b) is a cross-sectional view taken along line C—C with the panel of FIG. 6(a) being opened.

Here, the spring 8 is provided immediately above the upper end portion of the unit engaging body 7. In this case, the spring 8 is provided immediately above the upper end portion of the unit engaging main body 7a. In this embodiment, the spring 8 is provided under a compressed condition (as shown in FIGS. 6 (a) and 6(b) irrespective of the closed or opened condition of the panel 9. As shown in FIG. 6(a), this makes it possible to keep the unit engaging body 7 being inserted in the engaging through-hole 16a. That is, as described later, closing the panel 9 (pivoting the panel 9 from the position shown in FIG. 6(b) to that of FIG. 6(a)) allows the unit engaging body 7 to be inserted into the engaging through-hole 16a.

The projection 7b of the unit engaging body 7 is extended to the vicinity of the panel 9 and formed corresponding to the aforementioned stopper 9e and the engaging body presser portion 9f of the panel 9. More specifically, as shown in FIG. 6(a), the projection 7b is formed so as to be positioned between the stopper 9e and the engaging body presser portion 9f.

The stopper 9e and the engaging body presser portion 9f of the panel 9, and the projection 7b of the unit engaging body 7 are formed as described above. This allows the stopper 9e to prevent the unit engaging body 7 from being dislodged from the engaging through-hole 16a, with the panel 9 being engaged with the device unit 1 (FIG. 6(a)), even when the spring 8 provides only a weak force or has deteriorated.

In addition, upon mounting or dismounting the device unit 1 to or from the apparatus main body 15 (FIG. 6(b)), the engaging body presser portion 9f of the panel 9 is brought into contact with the projection 7b of the unit engaging body 7 along with the pivotal movement of the panel 9 and can push the projection 7b as well. That is, it is possible to disengage the device unit 1 from the apparatus main body 15.

Here, with the panel 9 being engaged with the device unit 1 (i.e., when the device unit 1 has been implemented on the apparatus main body 15), the lower end portion of the unit engaging main body 7a is extended to a predetermined length in order to allow the device unit 1 to be engaged with the apparatus main body 15. In this embodiment, the distance between the upper surface of the projection 7b and the lower end surface of the unit engaging main body 7a is made greater than that between the lower surface of the stopper 9e and the lower surface of a plate-shaped member 16, described later. This makes it possible to insert the unit engaging main body 7a into the engaging through-hole 16a.

Now, exemplified below are setting conditions of each of the parts, which are required to disengage the device unit 1 from the apparatus main body 15.

The engaging body presser portion 9f of the panel 9 is extended to a predetermined length with respect to the center of the pivot shaft 10. In addition, with the panel 9 being engaged with the device unit 1 (FIG. 6 (a)), the distance between the upper and lower surfaces of the projection 7b of the unit engaging body 7 is made slightly less than the shortest distance between the extended surface of the lower surface of the stopper 9e on the panel 9 and the shaft center of the pivot shaft 10.

Moreover, with the panel 9 being similarly engaged with the device unit 1 (FIG. 6(a)), the distance between the lower end surface of the unit engaging main body 7a and the upper surface of the plate-shaped member 16 is made less than the aforementioned predetermined length of the engaging body presser portion 9f of the panel 9. This makes it possible to withdraw the unit engaging main body 7a from the engaging through-hole 16a along with the pivotal movement of the panel 9.

That is, closing the panel 9 (FIG. 6(a)) causes the spring 8 provided in the unit engaging mechanism 6 to push the unit engaging body 7 to permit the insertion of the unit engaging body 7 (the unit engaging main body 7a) into the engaging through-hole 16a, described later, thereby allowing the device unit 1 to be engaged with the apparatus main body 15.

On the other hand, opening the panel 9 (FIG. 6(b)) causes the engaging body presser portion 9f formed on the panel 9 to push the projection 7b of the unit engaging body 7 to permit the withdrawal of the unit engaging body 7 (the unit engaging main body 7a) from the engaging through-hole 16a, thereby allowing the device unit 1 to be disengaged from the apparatus main body 15.

Now, the engaging through-hole 16a provided on the apparatus main body 15 will be explained below.

Figure 3:
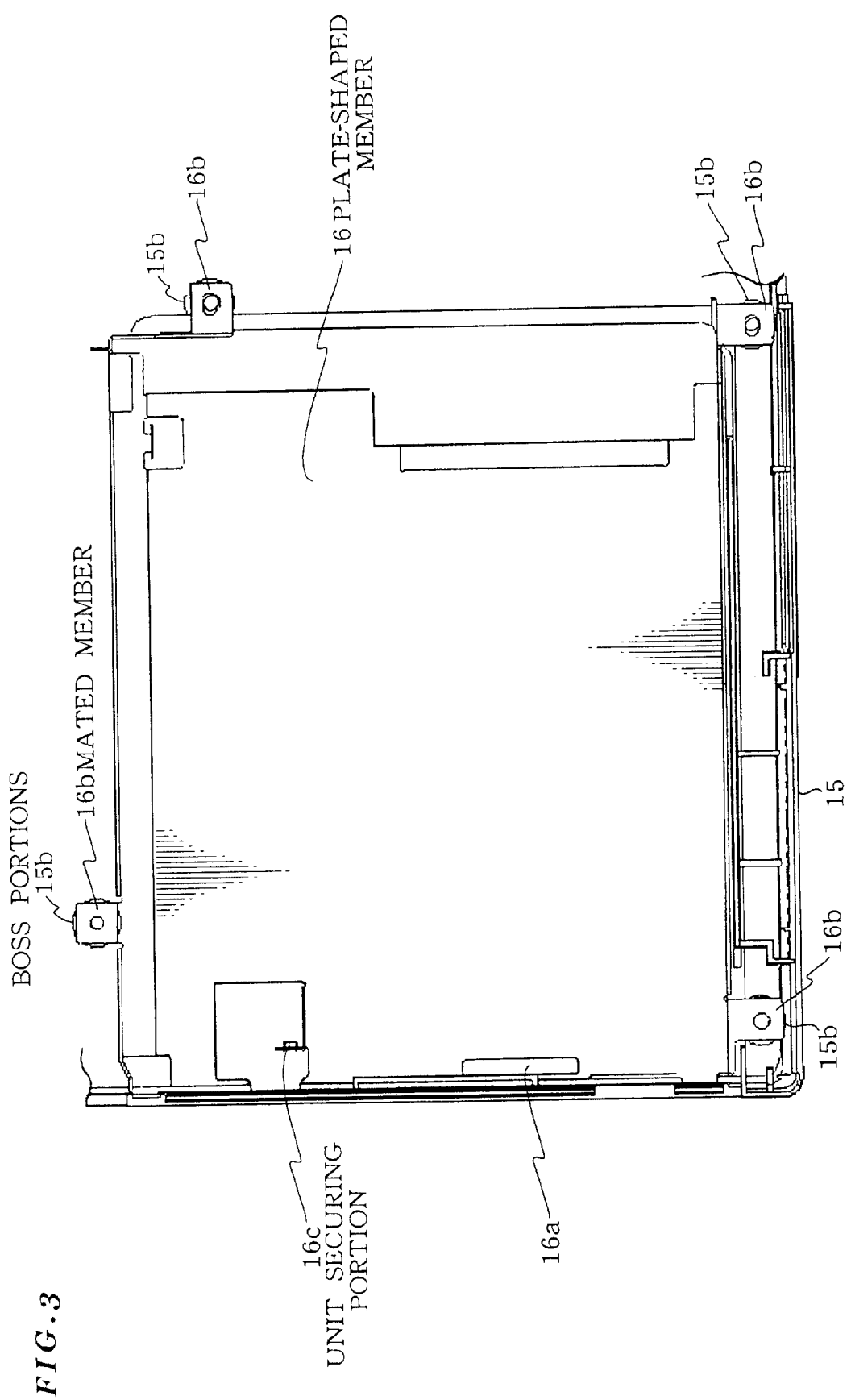
FIG. 3 is a top view illustrating the interior of the apparatus main body for implementing the device unit therein according to the embodiment.

As shown in FIG. 3, the engaging through-hole 16a is formed in the plate-shaped member 16 provided on the apparatus main body 15, and is shaped corresponding to the shape and position of the aforementioned unit engaging body 7 (the unit engaging main body 7a). In this embodiment, the unit engaging main body 7a is formed in the shape of a plate and thus the engaging through-hole 16a is also formed generally in the shape of a rectangle corresponding X to the shape of the unit engaging main body 7a.

Figure 4:
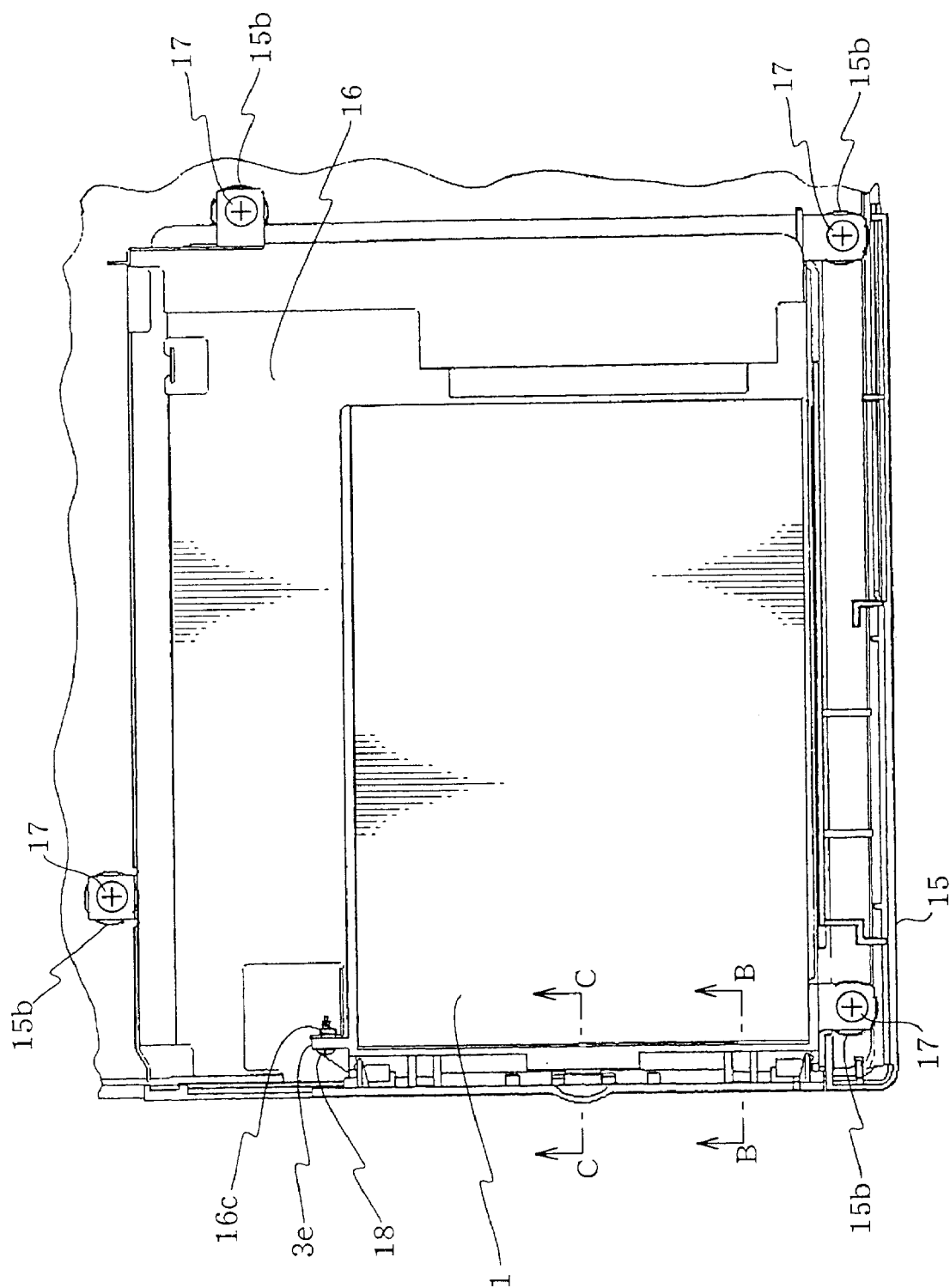
FIG. 4 is a top view illustrating the interior of the apparatus main body with the device unit implemented therein according to the embodiment.

Here, as shown in FIG. 4, the plate-shaped member 16 is secured to boss portions 15b, for example, by means of fastening members 17 such as screws via mated members 16b. The mated members 16b, each having a through-hole, are provided on the plate-shaped member 16 corresponding to the boss portions 15b.

In this embodiment, the plate-shaped member 16 is provided with a unit securing portion (joint member) 16c, illustrated in FIGS. 1 and 3, for securing the device unit 1. In addition, as shown in FIGS. 1 and 2, the unit holding body 3 is provided with a mated member 3e, having a notch, corresponding to the unit securing portion 16c. In this case, as shown in FIGS. 4 and 7(b), the device unit 1 is secured to the unit securing portion 16c of the apparatus main body 15, for example, by means of a fastening member 18 such as a screw via the mated member 3e provided on the device unit 1.

Incidentally, this embodiment has exemplified a magnetic disk drive unit as the device unit 1, but is not limited thereto. The device unit housing apparatus 5 may be configured to such a device unit as an optical disk drive unit or a battery.

As described above, the device unit housing apparatus according to the present invention allows the unit engaging body of the device unit engaging mechanism provided on the device unit such as a magnetic disk drive unit to be guided into or out of the engaging through-hole formed in the apparatus main body. The device unit is thereby engaged with or disengaged from the apparatus main body. Furthermore, the device unit engaging mechanism can be actuated by opening or closing the panel, thereby making it possible to easily engage the device unit with the apparatus main body. It is also made possible to easily disengage the device unit from the apparatus main body.

That is, only one operation of closing or opening the panel allows the device unit to be engaged with or disengaged from the apparatus main body. Furthermore, the device unit and the panel are integrally assembled, whereby the panel can also be used as a handle upon dismounting the device unit from the apparatus main body. Moreover, a fastening member such as a screw is used only at one position to secure the device unit to the apparatus main body, thereby making it possible to employ less number of parts than those required conventionally. This makes it possible to provide a device unit housing apparatus, superior to conventional ones, which is capable of reducing the number of parts such as fastening members and shortening the time for mounting and dismounting of the device unit.

The invention may be embodied in other specific forms without departing from the spirit or essential characteristic thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No. 2000-125969 (Filed on Apr. 26, 2000) including specification, claims, drawings and summary are incorporated herein by reference in its entirety.

What is claimed is:

1. A device unit housing apparatus comprising:
   an apparatus main body provided with an engaging through-hole formed therein for accommodating a device unit as an engaged subject; and a unit engaging mechanism provided on said device unit,
   said unit engaging mechanism comprising a unit engaging body movable and engageable with said engaging through-hole; an elastic member capable of pressing always said unit engaging body against said engaging through-hole; and a panel pivotable with respect to said device unit, said panel provided with an engaging body presser portion capable of pressing said unit engaging body against said elastic member along with a pivotal movement of said panel.

2. The device unit housing apparatus according to claim 1, wherein
   said panel is provided with a stopper for engaging said unit engaging body.

3. The device unit housing apparatus according to claim 1, wherein
   panel engaging members are provided in a standing manner on both ends of said panel and each of said panel engaging members is provided with an expanded projection, and said device unit is provided with engaged members each opposed to each of said panel engaging members, and each of said engaged members is provided with an engaging slot corresponding to each expanded projection of said panel engaging member.

4. The device unit housing apparatus according to claim 1, wherein said apparatus main body is provided with at least one fastening member, and said device unit is provided with mated members each having a mated portion corresponding to each of said fastening members.

5. The device unit housing apparatus according to claim 1, wherein said engaging through-hole is formed in one plate-shaped member and said plate-shaped member is provided on said apparatus main body.

6. The device unit housing apparatus according to claim 1, wherein said engaging through-hole is formed in one plate-shaped member and said plate-shaped member is provided on said apparatus main body, and said plate-shaped member is provided with at least one fastening member, and said device unit is provided with mated members each having a mated portion corresponding to each of said fastening members.

7. A device unit housing apparatus comprising:

an apparatus main body provided with an engaging through-hole formed therein for accommodating a device unit as an engaged subject; and a unit engaging mechanism provided on said device unit, wherein said unit engaging mechanism provided on said device unit is disposed, with said device unit being accommodated in said apparatus main body, adjacent to an opening of said apparatus main body for accommodating said device unit, said unit engaging mechanism comprises a unit engaging body movable and having a unit engaging main body engageable with said engaging through-hole, an elastic member capable of always pressing said unit engaging body against said engaging through-hole, and a panel spaced by a predetermined distance apart from said unit engaging main body and pivotable with respect to said device unit, said unit engaging main body is provided with a projection oriented toward said panel, and said panel is provided with an engaging body presser portion capable of engaging the projection of said unit engaging body along with a pivotal movement of said panel and pressing said unit engaging body against said elastic member, said engaging body presser portion being oriented toward said unit engaging body.

8. A device unit housing apparatus comprising:

an apparatus main body provided with an engaging through-hole formed therein for accommodating a device unit as an engaged subject; and a unit engaging mechanism provided on said device unit, said unit engaging mechanism comprising a unit engaging body movable and engageable with said engaging through-hole, and an elastic member capable of pressing always said unit engaging body against said engaging through-hole, wherein said apparatus main body is provided with at least one fastening member, and said device unit is provided with mated members each having a mated portion corresponding to each of said fastening members.

9. A device unit housing apparatus comprising:

an apparatus main body provided with an engaging through-hole formed therein for accommodating a device unit as an engaged subject; and a unit engaging mechanism provided on said device unit, said unit engaging mechanism comprising a unit engaging body movable and engageable with said engaging through-hole, and an elastic member capable of pressing always said unit engaging body against said engaging through-hole, wherein said engaging through-hole is formed in one plate-shaped member and said plateshaped member is provided on said apparatus main body, and said plate-shaped member is provided with at least one fastening member, and said device unit is provided with mated members each having a mated portion corresponding to each of said fastening members.

* * * * *